United States Patent
Liu

Patent Number: 6,084,008
Date of Patent: Jul. 4, 2000

[54] FIRE RETARDANT COATING COMPOSITION

[75] Inventor: Feipeng Liu, Statham, Ga.

[73] Assignee: J.M. Huber Corporation, Edison, N.J.

[21] Appl. No.: 09/354,404

[22] Filed: Jul. 15, 1999

Related U.S. Application Data

[63] Continuation-in-part of application No. 09/102,927, Jun. 23, 1998, Pat. No. 5,968,669.

[51] Int. Cl.[7] .............. C08K 21/14; C08J 9/32; C08J 9/00
[52] U.S. Cl. ............. 523/179; 523/218; 521/99; 521/107
[58] Field of Search ............ 521/107, 99; 523/179, 523/218

[56] References Cited

U.S. PATENT DOCUMENTS

| | | | |
|---|---|---|---|
| 3,574,644 | 4/1971 | Olstowski | 524/422 |
| 4,514,326 | 4/1985 | Salley | 106/15.05 |
| 4,977,194 | 12/1990 | Haas et al. | 521/99 |
| 5,023,280 | 6/1991 | Haas et al. | 521/106 |
| 5,173,515 | 12/1992 | Von Bonin et al. | 521/107 |
| 5,229,427 | 7/1993 | Madaj | 521/107 |
| 5,246,652 | 9/1993 | Hsu et al. | 264/109 |
| 5,434,200 | 7/1995 | Kolker et al. | 524/35 |
| 5,443,894 | 8/1995 | Pollack et al. | 428/213 |
| 5,500,471 | 3/1996 | Uota | 524/262 |
| 5,739,173 | 4/1998 | Lutter et al. | 521/99 |
| 5,968,669 | 10/1999 | Liu et al. | 521/54 |

*Primary Examiner*—Morton Foelak
*Attorney, Agent, or Firm*—Carlos Nieves

[57] ABSTRACT

A fire retardant coating composition which comprises expandable graphite particles, a solid absorbent material, a polymeric binder, a carbonific material, a blowing agent, a solvent and a rheology modifier. The expandable graphite particles include from about 20 to about 95% by weight of the combined amount of expandable graphite particles and solid absorbent material. The polymeric binder comprises from about 10 to about 50% by weight of the combined amount of the polymeric binder, the expandable graphite particles, and the solid absorbent material. The carbonific material comprises from about 0 to about 70% by weight of the combined amount of the carbonific material and the polymeric binder. Similarly, the blowing agent comprises from about 0 to about 70% by weight of the combined amount of the blowing agent and the polymeric material. The solvent comprises from about 25 to about 50% by weight of the total composition. The rheology modifier is present in an amount of from 0.001 to about 7% by weight of the total composition.

14 Claims, 2 Drawing Sheets

FIRE RETARDANT COATING COMPOSITION

RELATED U.S. APPLICATION DATA

Continuation-in-Part of Ser. No. 09/102,927 filed Jun. 23, 1998 U.S. Pat. No. 5,968,669.

TECHNICAL FIELD

The present invention relates to fire retardant coatings. More particularly, the invention relates to such coatings that promote the formation of insulating foams in order to provide fire protection to various substrates.

BACKGROUND OF THE INVENTION

It is often desirable to protect various inorganic and organic substrates from exposure to high temperatures and/or fire. Such substrates include lignocellulosic materials, polymeric materials, gypsum board (sheetrock), fiberglass and metal products.

In recognition of the foregoing, various compositions have been developed which can impart fire retardant/resistant performance to substrates. For example, heat expandable graphite and its use for providing flame resistance is well known in the art and described, for example, in U.S. Pat. No. 3,574,644, the disclosure of which is incorporated herein by reference. Heat expandable graphite is formed by treating crystalline graphite, which is composed of stacks of parallel planes of carbon atoms, with intercalants such as sulfuric acid and/or nitric acid. Since no covalent bonding exists between the planes of the carbon atoms, the intercalant can be inserted therebetween. This allows the intercalant to be positioned within the graphite lattice. When the intercalated graphite is exposed to heat or flame, the inserted molecules decompose and release gases. The graphite layer planes are forced apart by the gas and the graphite expands, thereby creating a low-density, non-burnable, thermal insulation that can reflect a high percentage of heat.

U.S. Pat. No. 5,443,894 discloses a fire retardant oriented strand board that includes expandable graphite containing outer layers. The outer layers contain resin bonded wood strands with up to 20% by weight of expandable graphite particles dispersed therein. Upon exposure to external flame, the expandable graphite particles undergo intumescence and increase in volume thereby forming a layer of vermiform expanded graphite. This layer creates a flame barrier for the underlying core layer. However, the use of expandable graphite in the outer layers has been found to cause a "popcorn effect" when such board is exposed to flame. This results in the outer layer fracturing and being blown off the panels. As the outer layer is blown off the panels, noxious gases and fumes, such as sulfur dioxide and nitrogen monoxide are given off.

Another approach for imparting fire resistance to cellulosic materials is disclosed in U.S. Pat. No. 5,434,200. This patent teaches combining finely divided lignocellulosic material with an amount of a magnesium oxychloride and/or magnesium oxysulphate containing latex effective to impart water and fire resistance to the lignocellulosic material. U.S. Pat. No. 5,246,652 discloses a method of producing a wood composite which includes treating a wood composite with a soluble boron compound to provide some degree of fire retardancy. A common drawback with each of these approaches is that high levels of noxious gases are created when the cellulosic materials are exposed to intensive heat and flames.

SUMMARY OF THE INVENTION

The present invention is designed to overcome the deficiencies of the prior art discussed above. It is an object of the invention to provide a fire retardant coating which expands when exposed to intense heat and/or flames to create a low density char foam and protect the underlying substrate to which it is applied.

It is a further object of the invention to provide such a coating that does not emit noxious gases, acid vapor, or undesirable levels of smoke when exposed to heat and flames.

In accordance with the illustrative embodiments and demonstrating features of the present invention, there is provided a fire retardant coating composition which comprises expandable graphite particles, a solid absorbent material, a polymeric binder, a carbonific material, a blowing agent, a solvent and a rheology modifier. The expandable graphite particles include from about 20 to about 95% by weight of the combined amount of expandable graphite particles and solid absorbent material. The polymeric binder comprises from about 10 to about 50% by weight of the combined amount of the polymeric binder, the expandable graphite particles, and the solid absorbent material. The carbonific material comprises from about 0 to about 70% by weight of the combined amount of the carbonific material and the polymeric binder. Similarly, the blowing agent comprises from about 0 to about 70% by weight of the combined amount of the blowing agent and the polymeric material. The solvent comprises from about 25 to about 50% by weight of the total composition. The rheology modifier is present in an amount of from 0.001 to about 5% by weight of the total composition.

Other objects, features and advantages will be readily apparent from the following detailed description of preferred embodiments thereof.

DETAILED DESCRIPTION OF PREFERRED EMBODIMENTS

Figure 1:
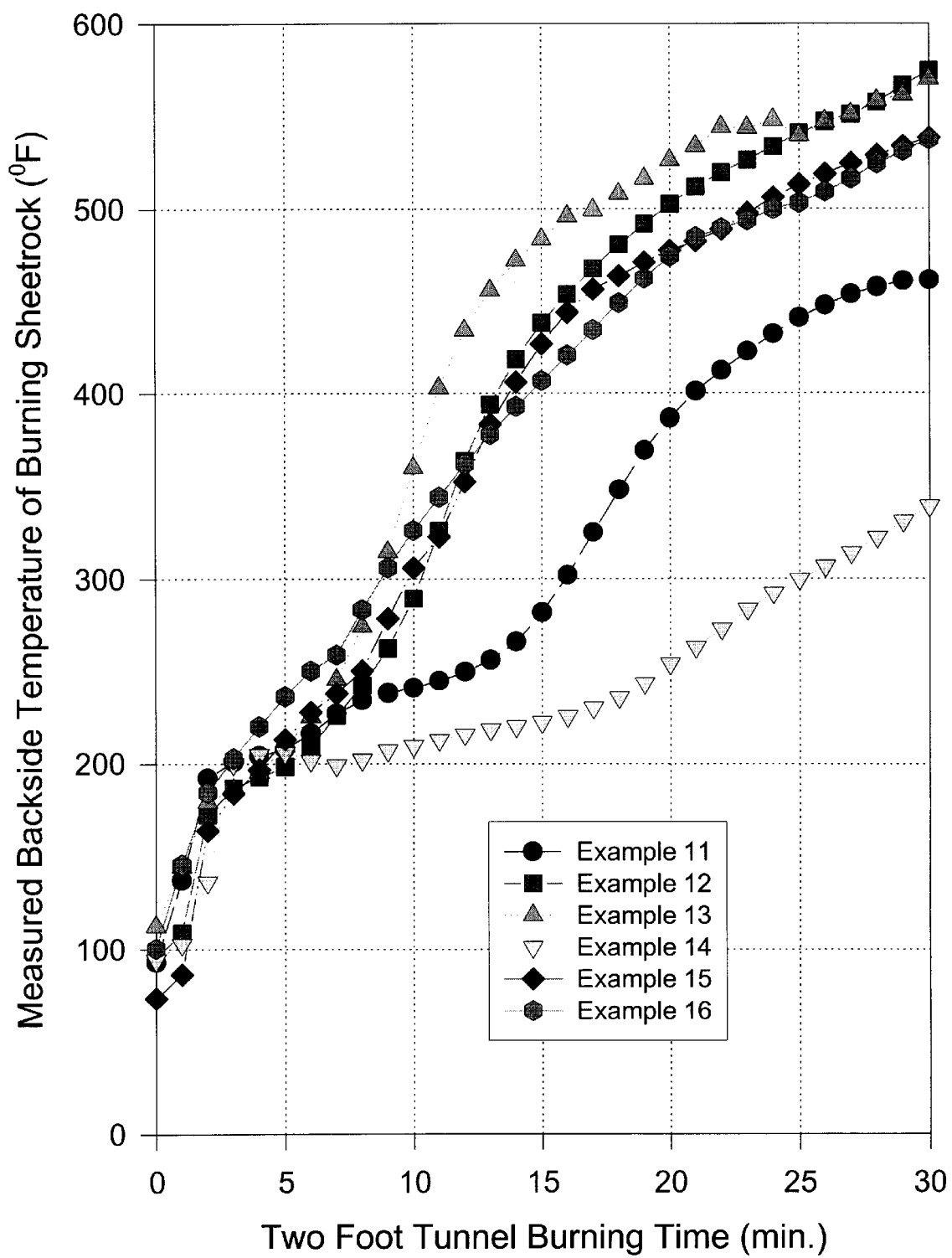
FIG. 1 is a graphical representation showing the comparison of the backside temperature as a function of tunnel testing time among various sheetrock substrates.

In accordance with the preceding summary, the present invention is directed toward a fire retardant, intumescent coating that can be applied to a variety of substrates in order to protect the same from excessive heat and/or fire.

The coating of the present invention preferably comprises expandable graphite particles, a solid absorbent material, a polymeric binder, a carbonific material, a blowing agent, a solvent and a rheology modifier. In the preferred embodiment, the expandable graphite particles include from about 20 to about 95% by weight of the combined amount of expandable graphite particles and solid absorbent material. The polymeric binder comprises from about 10 to about 50% by weight of the combined amount of the polymeric binder, the expandable graphite particles, and the solid absorbent material. The carbonific material comprises from about 0 to about 70% by weight of the combined amount of the carbonific material and the polymeric binder. Similarly, the blowing agent comprises from about 0 to about 70% by weight of the combined amount of the blowing agent and the polymeric material. The solvent comprises from about 25 to about 50% by weight of the total composition. The rheology modifier is present in an amount of from 0.001 to about 5% by weight of the total composition.

The heat expandable graphite particles exhibit effective flame retardant properties and significantly reduce the smoke density and the self-extinguishing time of the cured polymeric binders without adversely effecting the physical properties of the coating compositions. The heat expandable graphite particles are commercially available from a number of companies and have "onset" temperatures of from about 130° C. to about 500° C. The particles undergo dramatic expansion upon exposure to heat and flame. More particularly, the volume of the particles can increase to greater than 80 times their original volume in just a few seconds. A preferred expandable graphite is available from UCAR Carbon Company, Inc. under the name Graft Guard™. This material has an "onset" intumescent temperature of 160° C. after being exposed to flame for a few seconds.

Expandable graphite is known to have properties that decrease thermal conductivity and provide flame retardation with an insulative bulk layer. The expandable graphite responds to high heat and flames by forming individual units of self-expansion. This allows the graphite to protect the underlying substrate from flame breakthrough thereby eliminating the formation of cracks, a condition commonly referred to as "crocodiling."

In a preferred embodiment, the coating composition includes a carbonific material (poly-hydro compound) such as pentaerythritol, dipentaerythritol (DPE) [$C(CH_2OH)_4$], tri-pentaerythritol, pentaerythritol polyurethanes, phenol, triethylene glycol, resorcinol, inositol, sorbitol, dextrin, and starch. The carbonific material preferably comprises from about 0% to about 70% of the combined amount of carbonific material and polymeric binder. A preferred poly-hydro compound is pentaerythritol manufactured by Perstorp Polyols, Inc. of Toledo, Ohio. When exposed to excessive heat or flame, the carbonific materials provide a network linkage between adjacent expanded units of expandable graphite. This effectively inhibits any "popcorn" effect from taking place.

Further, when the coating of the present invention is heated to 130° C. and above, the heat expandable graphite particles release oxidizing agents such as sulfur dioxide and nitrogen monoxide gases, or acid vapor from nitric and/or sulfuric acid. These gases serve as catalysts to de-polymerize and pyrolyze the carbonific materials into intermittent chars. Consequently, a uniform and integrated insulating material is formed on the surface of the coated substrate.

As set forth above, toxic gases, such as $SO_x$ and $NO_x$, from the expanded graphite particles and fumes from dehydration and pyrolysis of carbonific materials are known to be harmful to the neighboring environment. In the present invention, a toxic gas absorbing material is added to the coating composition to remove and eliminate these toxic gases. This material absorbs gas/acid vapors and causes nonflammable gases such as carbon dioxide and $H_2O$ to be released upon exposure to flame and fire. Typical reaction mechanisms include:

(1) $M^+HCO_3 + \frac{1}{2}H_2SO_4 \rightarrow CO_2\uparrow + \frac{1}{2}(M^+)_2SO_4 + H_2O$ (2) $M^{++}CO_3 + SO_2 + \frac{1}{2}O_2 \rightarrow M^{++}SO_4 + CO_2\uparrow$ (3) $M^{++}O + SO_2 + NO \rightarrow M^{++}SO_4 + \frac{1}{2}N_2\uparrow$ (4) $M^{++}CO_3 + H_2SO_4 \rightarrow M^{++}SO_4 + CO_2\uparrow + H_2O$ (5) $M^{++}CO_3 \rightarrow M^{++}O + CO_2\uparrow$ where M is a monovalent or divalent cationic material. By neutralization, calcination, and oxidation of toxic gases with the above absorbent materials, the toxic gases can be eliminated from released volatiles. The formation of carbon dioxide, water vapor and calcium sulfate has also been shown to effectively form a non-flammable gas layer on the burning substrate, significantly retarding flame generation and reducing the coating surface temperature.

Preferred toxic gas absorbent materials include: limestone (CaO), calcium carbonate ($CaCO_3$), sodium hydrogen carbonate ($NaHCO_3$), and/or sodium carbonate ($Na_2CO_3$). In the preferred embodiment, the absorbent material is calcium carbonate available under the name Hubercarb® Q & W series from J.M. Huber Corporation of Edison, N.J. The preferred particles size of the absorbent materials is between from about 2 to about 20 $\mu$m and, more preferably, from about 2 to about 5 $\mu$m.

In order to increase the efficacy of the absorbent materials (e.g. absorption and neutralization of toxic gases), absorbent promoters are preferably added to the coating composition of the present invention. Such absorbent promoters are known to release water at high temperatures and include aluminum hydroxide, magnesium hydroxide, zinc borax and aluminum silicate. Such promoters preferably comprise from about 0 to about 60% by weight of the total weight of the promoters and the absorbent material. A preferred absorbent promoter is aluminum hydroxide (aluminum trihydrate or ATH) available from J.M. Hunter Corporation and sold under the mark Micral®. The preferred median diameter particle size of the ATH is less than 3.5 $\mu$m.

A blowing agent (sspumific material) is added to the coating in order to generate uniform intumescent char foams upon exposure to excessive heat and flames. Some preferred blowing agents include urea, butyl urea, dicyandiamide, benzene sulfonyl-hydrazide, melamine, encapsulated melamine-phosphate, chloroparaffin, guanidine, and glycine. The blowing agent preferably comprises from about 0% to about 70% of the combined amount of blowing agent and polymeric binder.

The pre-polymer binders utilized in the flame retardant coating of the present invention include the following thermosetting and thermoplastic resins: phenol formaldehyde (PF) resin, urea formaldehyde (UF), melamine reinforced urea formaldehyde (MUF) resin, urea formaldehyde resin and polyacrylic resin, isocyanate reinforced urea formaldehyde resin, melamine formaldehyde resin, resorcinol formaldehyde resin, isocyanate resin, and blends and co-polymers thereof.

A solvent(s) is added to the coating formulation. The solvent preferably comprises from about 25 to about 50% by weight of the total coating composition. In the preferred embodiment, a surfactant (wetting agent) in the amount of about 0.1% is added to the solvent in order to improve the miscibility of the formulation. The viscosity of the entire formulation is adjusted through the addition of the surfactant.

To promote the mixing of all above inorganic and organic components, a rheology modifier may be added to the coating composition in an amount of from about 0.001 to about 5.0% by weight of the total composition. In the preferred embodiment, the rheology modifier essentially comprises an inorganic thickener, an organic thickener or a mixture thereof. The inorganic thickeners that can be utilized include: attapulgite clays; sepiolite clays; organoclays, and silicas. The organic thickeners that can be utilized include: hydrophobe modified cellulosics (HMCs), such as hydroxyethyl cellulose (HEC), hydroxypropyl methyl cellulose (HPMC) and methyl cellulose; guar gum; sodium alginate, and synthetic hydrocarbon polymers such as acrylamide, polyolefinic sulfonate copolymers, polyvinyl alcohol and mixtures thereof.

The coating of the present invention limits char breakthrough and surface crocodiling when the coated substrate is exposed to excessive heat and/or flame. For the present purposes, "breakthrough" is defined as the point at which the char is broken, separated, or otherwise affected by the fire as the substrate is directly exposed to the flame environment.

In preparing the fire retardant, intumescent coating of the present invention, the absorbent promoter is first mixed with the solid absorbent to form a first mixture expressed herein as M1. As stated above, the absorbent promoter preferably comprises from about 0% to about 60% by weight of the total weight of M1. The expandable graphite particles are then mixed with M1 to form a second mixture expressed as M2. The expandable graphite particles preferably comprise from about 20% to about 95% of the total weight of M2. If the amount of heat expandable graphite is less than 20% of the total weight of M2, the formed coating will not provide sufficient intumescency and surface coverage to the substrate. On the other hand, if more than 95% of the graphite particles are added into the second mixture, an amount of absorbent material required to eliminate the deleterious toxic gases and acid vapors cannot be added.

The polymeric binders are then added to M2 to form a third mixture expressed as M3. The percentage of polymeric binders is preferably from about 10% to about 50% by weight of the total weight of M3.

Carbonific materials and blowing agents (spumific materials) are then added to M3 and form mixture M4. The carbonific material preferably comprises from about 0 to about 70% by weight of the combined amount of carbonific material and polymeric binder. Similarly, the blowing agent comprises from about 0 to about 70% by weight of the combined amount of blowing agent and polymeric binder. In some formulations these components may be left out entirely as the particular polymeric binder may have a dual role. For example, polyvinyl acetate (PVAC) is both a binder and a carbonific material. Further, melamine in the MUF resin may also serve as a blowing agent.

A solvent is added to M4 to form mixture M5. The solvent preferably comprises from about 25 to about 40% by weight of the final formulation (including water from the binder plus from later addition). The solvent preferably includes about 0.1% by weight of surfactant to improve the miscibility between the different components.

Lastly, the rheology modifier may be added to M5. The rheology modifier preferably comprises from about 0.001 to about 7% by weight of M5.

All of the components are blended in appropriate tanks and containers in a manner known in the art. The resultant flame retardant/resistant coating can be applied to the substrate to be coated by brushing, roller coating or diluted water spray. Thereafter, the coating is cured at room temperature or by using infrared heating equipment. In order to accelerate the curing speed of the polymeric binders (resins), catalysts can be added.

The formulated fire retardant coating can be applied on various lignocellulosic materials such as solid lumber, parallel strand lumber, timber strand, plywood, particle board, medium density fiberboard, hardboard, oriented strand board, and straw board. The coating can be used for interior as well as exterior applications as it is not prone to leeching. Specific applications of the coating include residential and commercial applications such as roofing, wall, floor sheathing, structural components for I-joints, underlayment, and exterior siding.

Such a coating can also be applied to other substrates such as metal roof sheathing, polymeric fabric composites, fiberglass laminated composites, gypsum board and other inorganic and organic substrates.

By way of example, and not limitation, Table I sets forth the ingredients in one preferred fire retardant coating formulation.

TABLE I

Fire Retardant (FR) Coating Formulation A

| Component | Preferred Percentage (by weight %) |
| --- | --- |
| Heat expandable graphite | 25.0 |
| Calcium Carbonate | 25.0 |
| Phenol Formaldehyde (PF) Resin | 6.16 |
| PF extender | 2.64 |
| Pentaerythritol | 2.64 |
| Melamine | 2.64 |
| Cholorparrin | 2.64 |
| Surfactant | 0.02 |
| Water | 26.4 |

The above formulation set forth in Table I was blended in the following manner. The expandable graphite, calcium carbonate, PF extender, melamine, chloroparaffin and pentaerythritol are pre-mixed in a container in powder form. The surfactant, PF resin and water are pre-mixed to form a liquid mixture in a separate container. The powder mixture is added to the liquid mixture and the two mixtures are blended together.

Samples of the fire retardant coating formulation set forth in Table I were subjected to further processing. The resultant examples are set forth in Examples 1 through 5.

EXAMPLE 1

About 240 ml of FR coating A was diluted with 160 ml of water. Thereafter, 0.4336 grams of Aerosil® 200 fumed silica (available from Degussa Aktiengelsellschaftof Germany) was added to the diluted mixture. The resultant mixture was mixed in a high shear mixture.

EXAMPLE 2

The FR coating mixture of Example 1 was re-poured into a 600 ml beaker. Another 0.4652 grams of Aerosil® 200 silica was added. The resultant mixture was mixed in a high shear mixer.

EXAMPLE 3

The FR coating mixture of Example 2 was re-poured into a 600 ml beaker. An additional 1.089 grams of Aerosil® 200 silica was added and the resultant mixture was mixed in a high speed mixer.

EXAMPLE 4

The FR coating mixture of Example 3 was re-poured in a 600 ml beaker. Another 0.502 grams of Aerosil® 200 silica was added and the resultant mixture was mixed in a high speed mixer.

EXAMPLE 5

The FR coating mixture of Example 4 was re-poured in a 600 ml beaker. Another 0.502 grams of Aerosil® 200 silica was added and the resultant mixture was mixed in a high speed mixer.

Each mixture set forth in Examples 1–5 was poured into a test tube. The times taken for each mixture to form clear separation between solid mixture and liquid mixture was recorded. In Examples 1–5 the Aerosil® 200 silica served as a rheology modifier.

Table II sets forth the time taken for the FR coatings to be separated into a clear solid and liquid phase system with differing amounts of the rheology modifier Aerosil® silica.

TABLE II

| Example | Accumulated rheology modifier | % rheology modifier to FR solid | Separation time |
|---|---|---|---|
| 1 | 0.4336 grams | 0.164 | 5 min. |
| 2 | 0.8999 grams | 0.340 | 5 min. |
| 3 | 1.9876 | 0.750 | 15 min. |
| 4 | 2.4896 | 0.940 | 15 min. |
| 5 | 3.0226 | 1.141 | 20 min. |

As can be seen in Table II, increasing the amount of the Aerosil® 200 silica (the rheology modifier) loading level results in a more stabilized FR coating suspension. Further, increasing the amount of the rheology modifier helps inhibit the sedimentation of FR solid from the suspension solution, thereby increasing the stability of FR coating mixture.

The addition of the rheology modifier yield certain benefits. Such benefits include: (1) improved dispersion; (2) stable suspension of components, and (3) improved consistency of coatings.

Table III lists the components of another FR coating formulation.

TABLE III

FR Coating Formulation B

| Component | % by weight |
|---|---|
| Heat expandable graphite | 19.564 |
| CaCO$_3$ | 17.890 |
| ATH | 1.630 |
| Phenol formaldehyde(50% solids) | 22.032 |
| Resorcinol formaldehyde(75% solids) | 0.625 |
| Pentaerythritol | 3.362 |
| Melamine | 1.674 |
| Chloroparaffin | 1.674 |
| Aerosil ® silica | 0.063 |
| Surfactant | 0.001 |
| Catalyst | 0.044 |
| Water | 26.438 |
| Phenol formaldehyde extender | 5.001 |
| Total | 100 |

FR Coating Formulation B was applied to different substrates as set forth in Examples 6 through 10.

EXAMPLE 6

Both sides of a 7/16" oriented strand panel were coated with FR Coating Formulation B at a loading level of 150 lbs/msf. The coated OSB board was thermally cured under infrared lamps for about 20 minutes and then oven cured at a temperature of about 120° C. for about another 30 minutes.

EXAMPLE 7

Two polyester composite sheets, each with a thickness of 10 mil (0.001 inch), were pressed to the top surface of an OSB panel by a 2'×2' hot press machine at 350° F. for 60 seconds. An isocyanate resin was utilized to bond the sheets to the OSB panel. The top surface of the panel was then coated with FR Coating Formulation B in the manner set forth in Example 6.

EXAMPLE 8

Two polyester composite sheets, each with a thickness of 10 mil were pressed to the top surface of an OSB panel by a 2'×2' hot press machine at 350° F. for 60 seconds. Similarly, two polyester composite sheets were pressed to the bottom surface of an OSB panel. The binder utilized to secure the sheets to the OSB panel was an isocyante based binder. The top and bottom surfaces of the panel were then coated with FR Coating Formulation B in the manner set forth in Example 6.

EXAMPLE 9

A 5 mil thick fiberglass sheet was pressed to the top surface of an OSB panel by a 2'×2' hot press machine at 400° F. for 90 seconds. A fast curing phenol formaldehyde resin was used to bond the fiberglass to the top surface of the OSB panel. The top surface of the panel was then coated with FR Coating Formulation B in the manner set forth in Example 6.

EXAMPLE 10

A 5 mil thick fiberglass sheet was pressed to the top surface of an OSB panel by a 2'×2' hot press machine at 400° F. for 90 seconds. A 5 mil thick fiberglass sheet similarly was pressed to the bottom surface of the OSB panel. A fast curing phenol formaldehyde resin was used to bond the fiberglass sheets to the OSB panel. The top and bottom surfaces of the panel were then coated with FR Coating Formulation B in the manner set forth in Example 6.

The testing results for Examples 6–10 are summarized in Tables IV. As used throughout, fire retardancy was determined by flame spread index (FSI) of tested samples based upon ASTM D 3806-79. Ignition time, heat release rate, mass loss rate, and smoke density were determined by cone calorimeter measurements based upon ASTM E 1354-94 standard at a heat flux of 50 kW/m$^2$.

TABLE IV

Flame Spread Index and Cone Calorimeter Measurements

| Example No. | Coat lbs/msf[a] | Avg. Flame Spread Index | Ignition Time (sec.)[b] | 60's HRR (kW/m$^2$)[c] | Avg. SEA (m$^2$/kg)[d] |
|---|---|---|---|---|---|
| 6 | 154 | 25.0 | 87.7 | 36.5 | 104.0 |
| 7 | 151 | 27.5 | 137 | 41.6 | 123.0 |
| 8 | 154 | 15.0 | 35 (self-extinguished) | 17.2 | 121.0 |
| 9 | 154 | 21.3 | 45 (self-extinguished) | 13.4 | 75.5 |
| 10 | 150 | 15.0 | 45 | 40.5 | 80.0 |

[a] refers to the coating surface coverage on the two sides of a panel per 1000 ft.$^2$
[b] refers to the time required for the sample to ignite upon exposure to a heat flux of 50 kW/m$^2$ under cone calorimeter test
[c] refers to the average heat release rate in the first 60 seconds after the sample has been ignited
[d] refers to the average specific extinction area in the whole burning process The cone calorimeter is a useful tool for characterizing material behavior in terms of fire safety. For example, ignition time is referred to as the interval for the sample to ignite upon its exposure to a fixed heat flux under the heating cone. The flame spread index values in Table IV is the mean average of three tunnel testing samples. Table IV demonstrates that FR Coating Formulation B can be used on lignocellulosic materials as well as other inorganic or organic composite materials to protect the composite substrate from flame and/or fire.

Examples 11 through 16 describe several samples of sheet rock which were cut from a 4'×8' by ½" (gypsum wallboard/drywall manufactured by Republic Gypsum) to demonstrate the efficacy of the flame retardant coating of the present invention.

The sheetrocks were used as the substrate for the following 2 foot tunnel testing (ASTM E 1354-94 standard). The backside temperatures of the treated sheetrocks were measured by a thermometer. The thermocouple installed on the backside of the tested sheetrock was about 5 inches from the bottom end of the tested sheetrock. Table V sets forth the results of the backside temperature readings of the coated and un-coated samples described in Examples 11–16.

EXAMPLE 11

A ½"×24"×3⅞" regular sheetrock was installed following ASTM D 3806-79 standard test with an extended burning time.

EXAMPLE 12

A ½"×5"×3⅞" regular sheetrock was butted together with a ½"×19"×3⅞" regular sheetrock in the 2 foot tunnel chamber.

EXAMPLE 13

A ½"×5"×3⅞" regular sheetrock butted together with a ½"×18½"×3⅞" was installed following ASTM D 3806-79 standard in the 2 foot tunnel testing chamber. A gap with a distance of 1.6 mm was reserved between butted sheetrock edges by using 0.8 mm thick aluminum shims.

EXAMPLE 14

A ½"×24"×3⅞" regular sheetrock was coated with formulation B at a loading level of 145.6 lbs/msf. Then, the coated FR sheetrock was oven-dried at 100° C. for about 30 min. It was tested in 2-foot tunnel chamber following ASTM D 3806-79 standard.

EXAMPLE 15

A ½"×5"×3⅞" sheetrock and a ½"×18½"×3⅞ sheetrock were coated with FR coating formulation B on their edge only at a loading level of 82.86 lbs/msf by brushing. They were oven-dried at 100° C. for about 30 min. to cure the FR coating before they were butted together and installed in the two 2 foot tunnel testing chamber.

EXAMPLE 16

A ½"×5"×3⅞" sheetrock and a ½"×18½"×3⅞ sheetrock were coated with FR coating formulation B on their edge only at a loading level of 85.5 lbs/msf. They were oven-dried at 100° C. for about 30 min. Both of them were installed in the 2 foot testing chamber by butting them together with a gap distance of 1.6 mm.

TABLE V

The Backside Temperature of Sheetrock Substrates as a Function of Tunnel Burning Time
Unit of temperature: (° F.)

| Time (min.) | Example 11 | Example 12 | Example 13 | Example 14 | Example 15 | Example 16 |
|---|---|---|---|---|---|---|
| 0 | 92.9 | 95.6 | 112.3 | 94.1 | 73.4 | 100.4 |
| 1 | 137.2 | 108.7 | 144.5 | 102.8 | 86.2 | 145.8 |
| 2 | 192.2 | 172.6 | 179.3 | 136.3 | 164 | 184.5 |
| 3 | 200.9 | 186.7 | 185.9 | 199.8 | 184 | 202.7 |
| 4 | 204.1 | 192.8 | 195.3 | 204.7 | 196.6 | 220 |
| 5 | 207.7 | 198.2 | 209.3 | 205.6 | 213 | 236.2 |
| 6 | 216.2 | 209.7 | 225.2 | 201.6 | 227.7 | 250.2 |
| 7 | 227 | 225.9 | 245.3 | 198.9 | 237.8 | 258.7 |
| 8 | 234.2 | 242.1 | 274 | 202 | 250.2 | 283.1 |
| 9 | 238.1 | 262.1 | 314.5 | 206.8 | 278.3 | 306 |
| 10 | 240.8 | 289.1 | 359.8 | 209.3 | 305.8 | 326.2 |
| 11 | 244.6 | 326 | 402.7 | 212.6 | 322.7 | 344.2 |
| 12 | 249.5 | 363.6 | 434 | 215.6 | 352.4 | 362 |
| 13 | 256 | 393.8 | 455.8 | 218.2 | 383.2 | 377.8 |
| 14 | 265.7 | 418.3 | 472 | 220 | 405.9 | 392.8 |
| 15 | 281.5 | 438 | 483.7 | 222.3 | 426.6 | 406.6 |
| 16 | 301.9 | 453.6 | 495.9 | 225.4 | 443.7 | 420.5 |
| 17 | 325.1 | 467.6 | 499.1 | 230 | 456.3 | 434.3 |
| 18 | 348.1 | 480.6 | 507.8 | 235.6 | 463.5 | 448.9 |
| 19 | 369.2 | 491.8 | 516.1 | 243.2 | 470.9 | 462.2 |
| 20 | 386.6 | 502.4 | 525.8 | 253.6 | 477.4 | 474.3 |
| 21 | 401 | 511.7 | 533.5 | 262.8 | 482.6 | 484.7 |
| 22 | 412.2 | 519.3 | 543.8 | 272.7 | 488.9 | 489.4 |
| 23 | 422.5 | 526 | 543.4 | 283.3 | 497.5 | 493.7 |
| 24 | 432.2 | 533.3 | 547.6 | 292.1 | 506 | 499.9 |
| 25 | 440.8 | 540.5 | 539.3 | 299.7 | 513 | 503.1 |
| 26 | 447.7 | 546.8 | 546.8 | 306.7 | 518.6 | 509 |
| 27 | 453.6 | 550.6 | 550.8 | 313.9 | 524.3 | 516.2 |
| 28 | 457.7 | 557.1 | 558 | 322.4 | 528.5 | 524.2 |
| 29 | 460.8 | 566.3 | 561 | 331 | 533.5 | 531 |
| 30 | 461.3 | 574.2 | 569.7 | 339.1 | 538 | 537.1 |

FIG. 1 is a graphical representation showing the comparison of the backside temperature as a function of tunnel testing time among the various sheetrock substrates set forth in Examples 11–16. FIG. 1 demonstrates that the backside temperature of an untreated sheetrock substrate (Example 11) will arrive at about 460° F. in about 30 minutes while the backside temperature of a sheetrock substrate treated with FR Coating Formulation B (Example 14) will only be 330° F. after about 30 minutes. FIG. 1 also demonstrates that treating the edge of the sheetrock with FR Coating Formulation B (Examples 15 and 16) will add a certain degree of fire resistance to the butted sheetrock.

Table VI sets forth the components of yet another FR Coating Formulation.

TABLE VI

FR Coating Formulation C

| Chemical Name | Percentage by Wt |
|---|---|
| Expandable graphite | 22.366 |
| $CaCO_3$ | 19.671 |
| Aluminum tri-hydrate (ATH) | 2.237 |
| Polyacrylated binders (50% conc.) | 26.830 |
| Melamine | 2.236 |
| Pentaerythritol | 4.473 |
| Chloro-paraffin | 3.192 |
| Melamine formaldehyde resins | 2.549 |

TABLE VI-continued

FR Coating Formulation C

| Chemical Name | Percentage by Wt |
|---|---|
| (97.66% conc.) Surfactant | 0.050 |
| Special Additives (Rheology Modifiers) | 0.050 |
| Water/polyether glycol (100/1) | 16.350 |

Examples 17 sets forth a description of an aluminum roofing sheet substrate that was subjected to a 2 foot tunnel burning test. Example 18 sets forth a similar description of a substrate that was coated with FR Coating Formulation C. Table VI sets forth the results of the backside temperature readings of the coated and un-coated samples described in Examples 17 and 18.

EXAMPLE 17

An aluminum roofing-sheet with a thickness of 0.8 mm and 4"×23⅞" width and length was installed in the 2 foot testing tunnel chamber. The backside temperature of the aluminum roof sheet was determined and listed in Table VII.

EXAMPLE 18

An aluminum roofing-sheet with a thickness of 0.8 mm and 4"×23⅞" width and length was first coated on its surface with formulation C at a loading level of 73.67 lbs/msf.

The FR coatings were first air-dried for two hours and then cured in the oven for 30 min. at 100° C. Then, the FR coated aluminum-roofing sheets were installed in the 2 foot tunnel-testing chamber with the FR coating toward to the flame. The backside temperature of the aluminum-roofing sheet was determined and listed in Table VII.

TABLE VII

The Backside Temperature of Aluminum Roofing Sheet Substrates as a Function of Tunnel Burning Time
Unit of temperature: (° F.)

| Time (min.) | Without FR coatings | With FR coating formulation C |
|---|---|---|
| 0 | 113.4 | 176.4 |
| 1 | 323.1 | 247 |
| 2 | 432.7 | 283 |
| 3 | 484.4 | 298.6 |
| 4 | 519.1 | 320 |
| 5 | 543.8 | 338.8 |
| 6 | 564.8 | 359.1 |
| 7 | 581.4 | 376.9 |
| 8 | 595.6 | 373.1 |
| 9 | 608.2 | 373.1 |
| 10 | 622.6 | 377.8 |
| 11 | 630.7 | 381.4 |
| 12 | 651.1 | 384.3 |
| 13 | 662.6 | 386.5 |
| 14 | 662.8 | 388.8 |
| 15 | 671.4 | 390 |
| 16 | 671.6 | 392.2 |
| 17 | 678.8 | 394.4 |
| 18 | 686.5 | 395.8 |
| 19 | 685.8 | 399.4 |
| 20 | 691.7 | 400.3 |
| 21 | 685.8 | 402.8 |
| 22 | 682.6 | 405.4 |
| 23 | 679.1 | 405.2 |
| 24 | 674.8 | 405.4 |
| 25 | 695.3 | 409.9 |

TABLE VII-continued

The Backside Temperature of Aluminum Roofing Sheet Substrates as a Function of Tunnel Burning Time
Unit of temperature: (° F.)

| Time (min.) | Without FR coatings | With FR coating formulation C |
|---|---|---|
| 26 | 715.9 | 412.2 |
| 27 | 713.9 | 414.2 |
| 28 | 728.1 | 416.3 |
| 29 | 732.2 | 418 |
| 30 | 736.9 | 417.4 |

Figure 2:
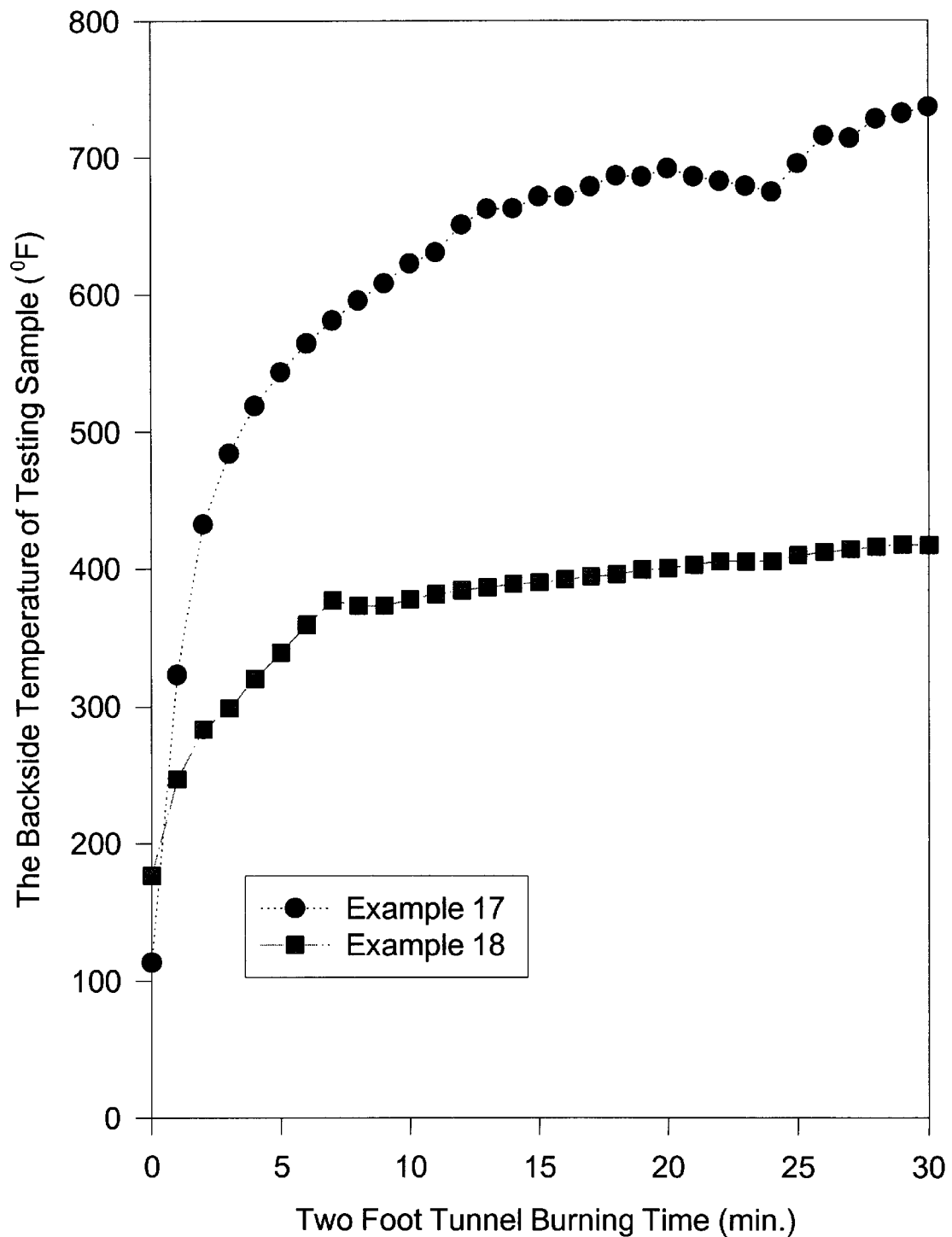
FIG. 2 is a graphical representation showing the comparison of the backside temperature as a function of tunnel testing time among two aluminum roofing sheet substrates.

FIG. 2 is a graphical representation showing the comparison of the backside temperature as a function of tunnel testing time among the two aluminum roofing sheet substrates set forth in Examples 17–18. FIG. 2 clearly demonstrates that treating the aluminum roofing sheet with FR Coating Formulation C dramatically increases the fire resistance of the same.

The present invention may be embodied in other specific forms without departing from the spirit or essential attributes thereof and accordingly reference should be made to the appended claims rather than to the foregoing specification as indicating the scope of the invention.

What is claimed is:

1. A fire retardant coating composition comprising:
   expandable graphite particles, a solid absorbent material, a polymeric binder, and a solvent;
   wherein said expandable graphite particles comprise from about 20 to about 95% by weight of the combined amount of said expandable graphite particles and said solid absorbent material, said polymeric binder comprises from about 10 to about 50% by weight of the combined amount of said polymeric binder, said expandable graphite particles, and said solid absorbent material, and said solvent comprises from about 25 to about 50% by weight of the total composition.

2. The composition of claim 1 further including a carbonific material, said carbonific material comprises from about 0 to about 70% by weight of the combined amount of said carbonific material and said polymeric binder.

3. The composition of claim 1 further including a blowing agent, said blowing agent comprising from about 0 to about 70% by weight of the combined amount of said blowing agent and said polymeric binder.

4. The composition of claim 1 wherein said solid absorbent material is selected from the group consisting of limestone, calcium carbonate, sodium hydrogen carbonate and sodium carbonate.

5. The composition of claim 2 wherein said carbonific material is selected from the group consisting of pentaerythritol, dipentaerythritol, tri-pentaerythritol, pentaerythritol polyurethane, phenol, triethylene glycol, resorcinol, inositol, sorbitol, dextrin, and starch.

6. The composition of claim 3 wherein said blowing agent is selected from the group consisting of urea, butyl urea, dicyandiamide, benzene sulfonyl-hydrazide, melamine, chloroparaffin, guanidine, and glycine.

7. The composition of claim 1 wherein said polymeric binder is selected from the group consisting of phenol formaldehyde resin, urea formaldehyde, melamine reinforced urea formaldehyde resin, polyacrylic resin, isocyanate reinforced urea formaldehyde resin, melamine formaldehyde resin, resorcinol formaldehyde resin, isocyanate resin, and mixtures and co-polymerizations thereof.

8. The composition of claim 1 wherein said expandable graphite particles are treated with an intercalant material.

9. The composition of claim 8 wherein said intercalant material is selected from the group consisting of intercalation compounds of $SO_x$, $NO_x$, and a halogen.

10. The composition of claim 1 further including an absorbent promoter, said absorbent promoter comprising from about 0 to about 60% by weight of said combined amount of said absorbent material and said absorbent promoter.

11. The composition of claim 10 wherein said absorbent promoter is selected from the group consisting of calcium hydroxide, aluminum trihydrate, magnesium hydroxide, and zinc hydroxide.

12. The composition of claim 1 wherein said solvent includes a surfactant in the amount of 0.1% by weight of the total amount of said solvent.

13. The composition of claim 1 further comprising a rheology modifier in an amount of from about 0.001 to about 7.0% by weight of the total composition.

14. The composition of claim 13 wherein said rheology modifier is selected from the group consisting of attapulgite clays, sepiolite clays, organo clays, silicas, hydroxyethyl cellulose, methyl cellulose, guar gum, sodium alginate, guar gum, sodium alginate, acrylamide, polyolefinic copolymers, polyvinyl alcohol and mixtures thereof.

\* \* \* \* \*